Oct. 10, 1961 H. SICKEL 3,003,285
APPARATUS FOR THE MECHANICAL SEPARATION OF A PART
FROM A ROD OR TUBELIKE WORK PIECE
Filed May 11, 1956 4 Sheets-Sheet 2
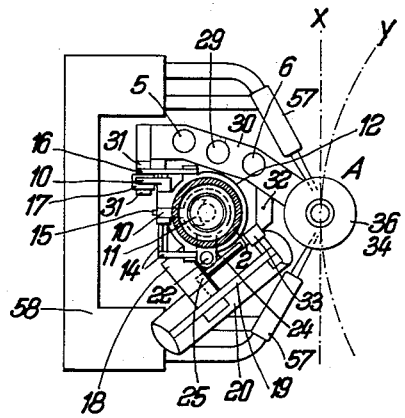
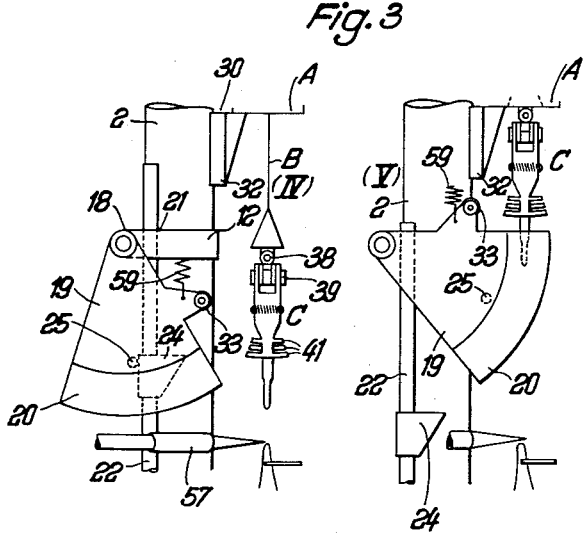
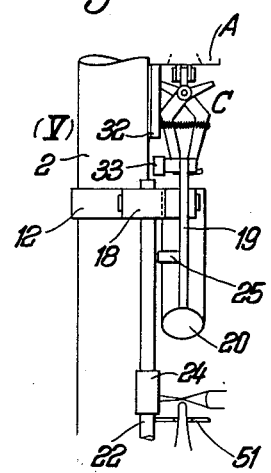
Inventor:
Helmut Sickel

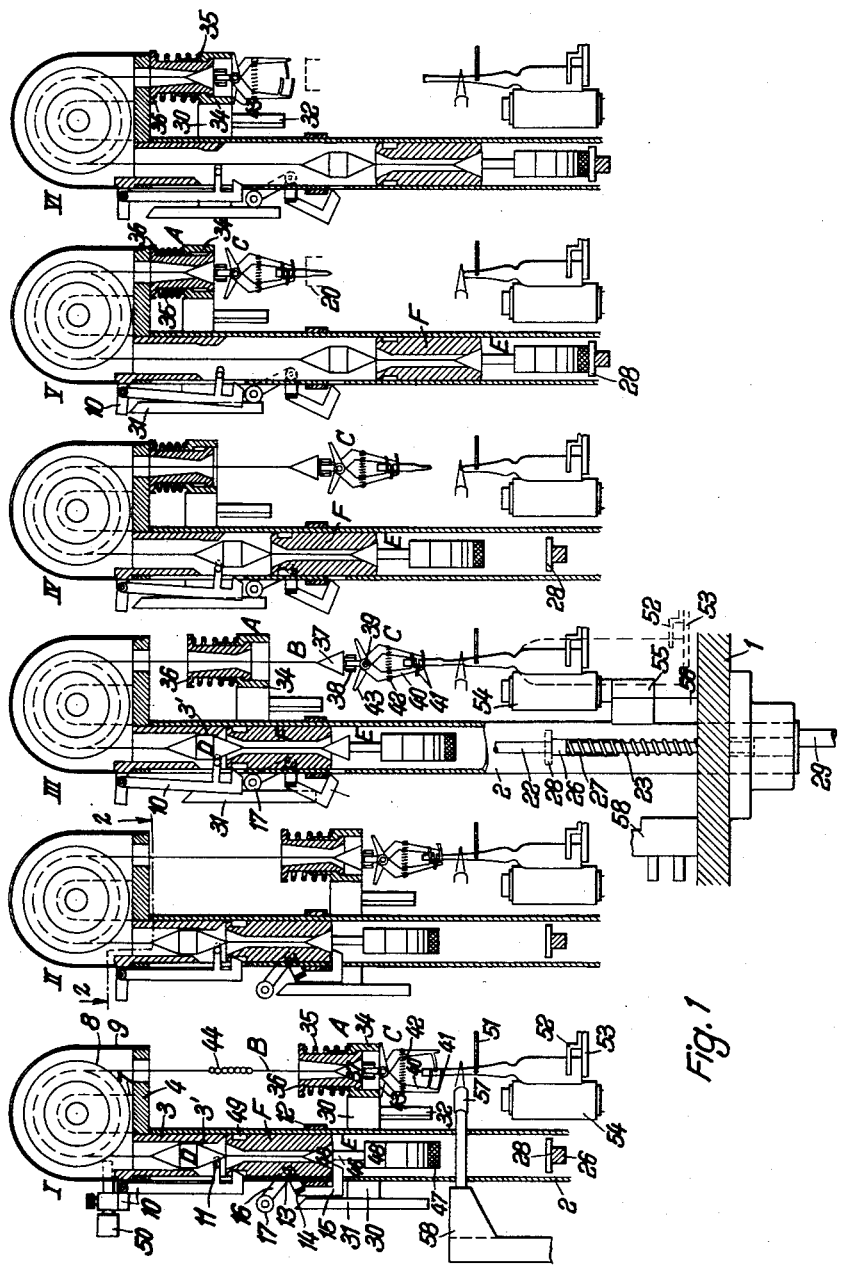

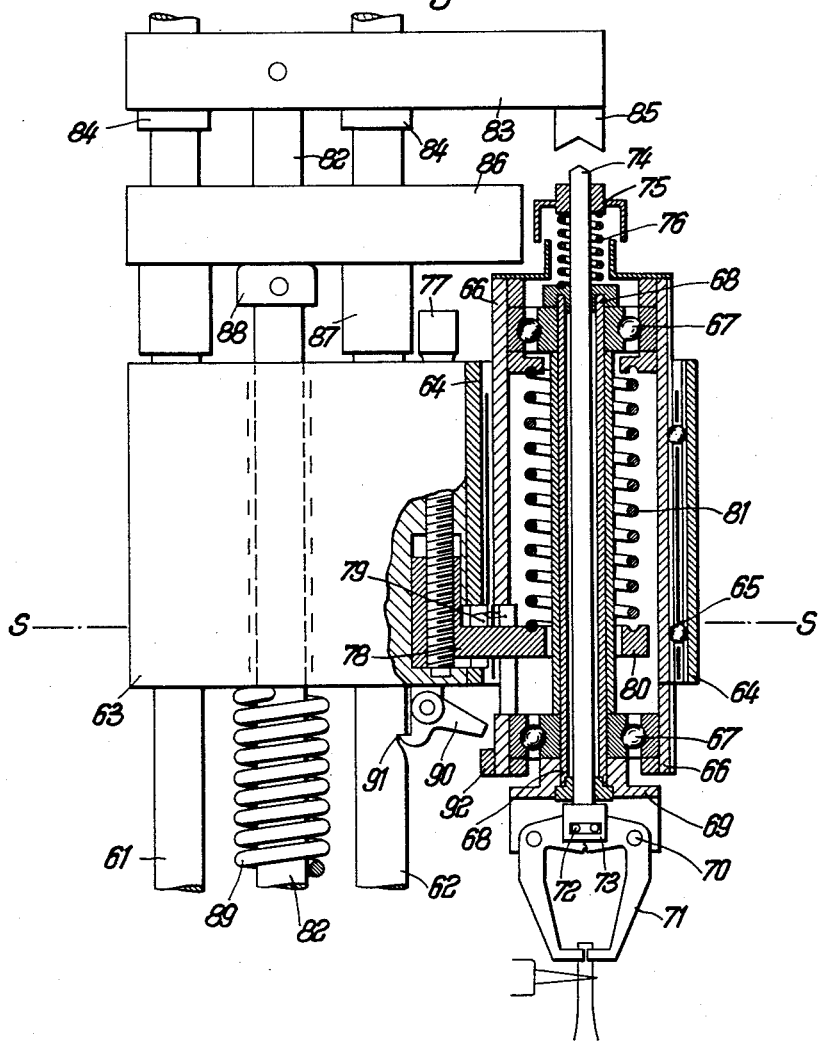
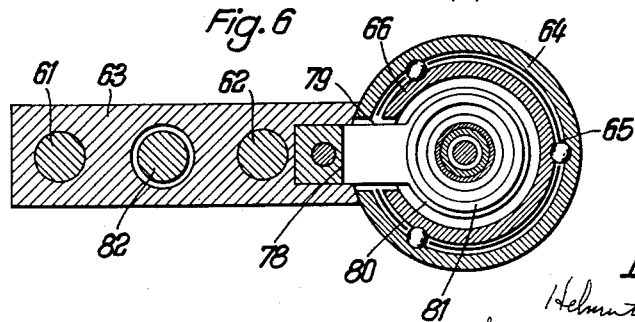

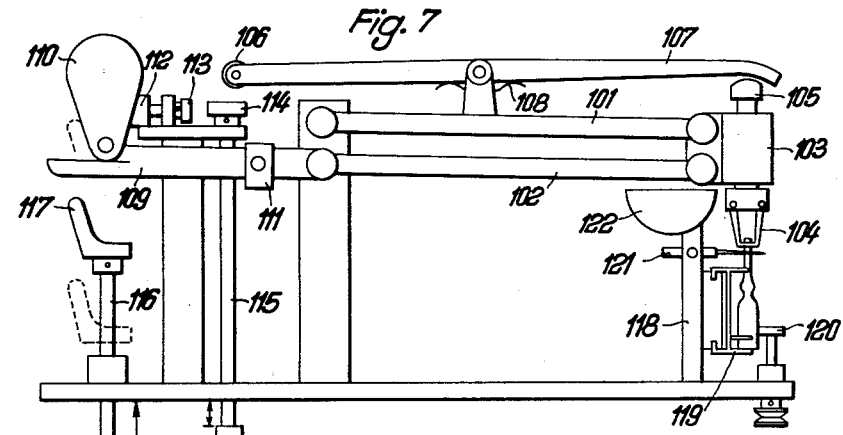
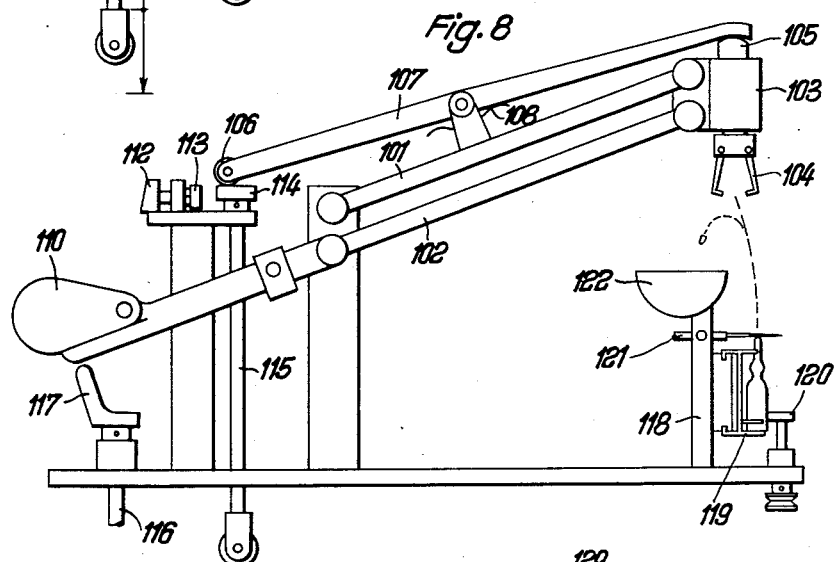
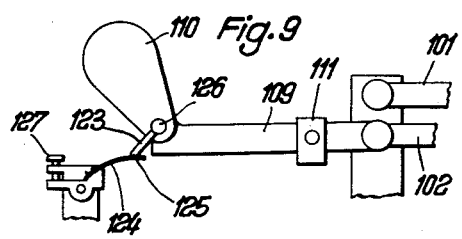
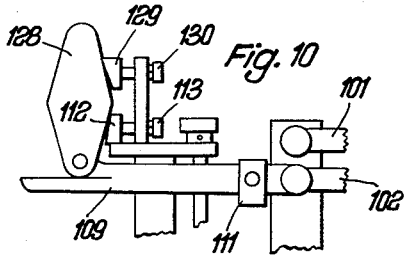

United States Patent Office 3,003,285
Patented Oct. 10, 1961

3,003,285
APPARATUS FOR THE MECHANICAL SEPARATION OF A PART FROM A ROD OR TUBELIKE WORK PIECE
Helmut Sickel, Springeltwiete 9, Hamburg, Germany
Filed May 11, 1956, Ser. No. 584,346
Claims priority, application Germany May 14, 1955
19 Claims. (Cl. 49—7)

The invention relates to an apparatus for the mechanical separation of a part from a rod or tubelike work piece which is made of a material capable of being softened by heat. The invention is particularly, but not exclusively, concerned with the mechanical closing of ampuls or the like by the separation of the tip thereof.

In the known drawing processes for rods and tubes and also in the known sealing of ampuls, the piece to be separated is removed by drawing whilst the point of separation is being heated. Thus a softened zone produced by the heating is continuously drawn to a strand with a simultaneous reduction in diameter and, in the case of tubes and ampuls, with a continuous reduction in wall thickness, this strand being finally melted through in the zone of the hottest flame.

However, in rods, tubes and ampuls, pointed ends are not desired and in tubes and ampuls the danger of fracture is increased by the thinly drawn wall. Frequently the thin wall produced by the drawing process, cannot withstand the internal pressure produced by the heat and blows out; alternatively it may be melted through when it is not removed in good time from the flame area. The resistance to pressure is further reduced since the thin wall sharply merges into a solid glass knob resulting from the melting of a piece of the glass thread produced by the drawing process whereby unfavorable stress ratios are formed. Moreover, the glass threads hanging at the drawn end are not only troublesome but, in the case of ampuls, present a serious danger as the glass particles resulting from the breakage of these threads float in the air and can fall into open ampuls.

Moreover, special difficulties arise with these drawing processes, if the tubelike work pieces to be treated have different diameters or wall thicknesses, and this very frequently occurs particularly in the tips of ampuls. In such cases the glass or other material is occasionally not sufficiently softened when due for drawing as determined by the timing of the machine with the result that the pincers holding the tip slip or incomplete drawing is obtained; occasionally the material is softened to such an extent that the wall blows out or melts before drawing takes place. The result is a considerable amount of wastage.

The invention has as its primary object the development of a novel apparatus which in use obviates or reduces the disadvantages described and delivers uniform separated parts and, in the case of tubes and ampuls, provides reliably sealed and resistant fused closures.

According to one aspect of the invention, in the mechanical separation of a part from a rod- or tube-like work piece made of a material capable of being softened by heat and in the closing of ampuls or the like with the separation of a tip piece, the process is such that the work piece is heated at a predetermined separating point and, at the moment of suitable softening, a force previously held inoperative is released for action on the piece to be separated, thereby suddenly to break off the piece.

In the operation of the apparatus of this invention the separation is not effected, as in the known processes, by a drawing process which extends over a measurable period and through a corresponding extended path followed by final melting of the resulting thread of work material, but by means of a sudden breaking action so that there is no time at all for the walls to become thin by drawing. The sudden movement of separation provides, due to the action of the flame, a well-rounded fused top with an almost uniform continuous wall thickness. This uniform thickness and therefore resistance and reliable sealing of the fused closure is particularly important for ampuls and moreover the suddenness and violence of the separation of the softened tip part does not permit the formation of glass threads.

Another object of the invention is to facilitate and improve this novel separating action of the apparatus particularly, but not exclusively, in the case of work pieces having wide diameter or thin walls. Thus the work piece or the ampul spear or tip can, before being sufficiently heated for the sudden breaking off, be stretched by a certain amount and thereby somewhat narrowed; on the other hand, a limited compression which effects a thickening of the wall can be carried out.

Another object of the invention is to take into account or compensate for the varying rapid softening of work pieces which deviate in diameter and in wall thickness, and to obtain, in spite of these deviations, equally good results. Thus, said preparatory stretching or compression may advantageously be effected, irrespectively of the timing of the machine, by a spring or weight acting on the pincers and adjusted to a predetermined tension or pressure action.

Another object of the invention is to prevent said preparatory stretching or compression taking place too quickly on increasing softening and also to compensate for the minute weakening of the wall caused by the preparatory stretching. This is attainable by a suitable braking of the stretching or compression movement, which also permits the flow of softened material to the hottest part thereby effecting a strengthening of the wall. A similar effect is attainable when the stretching is followed by a short compression prior to the sudden breaking off.

Another object of the invention is to ensure that said preparatory stretching or compression, in spite of the different times required by different work pieces, is followed directly by the sudden breaking off action, which means to say that the attack of the breaking means is automatically controlled by the varying rapid softening as a function of the unequalities of the work pieces. Thus, the tensioned and locked force for the breaking off action may be released, irrespectively of the timing of the machine, by the stretching or compression movement; for example, the pincers or their carrier may release the lock at a certain end position as at this point each work piece, in spite of deviations in dimensions, has a uniform degree of softening suitable for breaking.

Thus the stretching or compression is desirably effected even if it is not absolutely necessary for shaping reasons. With completely uniform work pieces, it can be dispensed with and the release of the lock can be effected mechanically at the moment of reaching a softening degree suitable for the breaking, as this moment does not vary. On the other hand with different work pieces in which the degree of softening suitable for breaking occurs at different times, the described stretching or compression treatment by means of a spring or weight has the important advantage of automatic regulation not only of this treatment but also of the subsequent breaking, if the stretching or compression also effects the release of the breaking force. The automatic operation of the actual working parts in this case limits the mechanical work in bringing the working parts back to their starting position.

According to another feature of the invention said preparatory stretching or compression may be replaced by suitable other deformation, for example by a bending or a torsional deformation. Also here the extent of the deformation serves to determine the moment of softening suitable for breaking, and the deformation means may, when reaching a certain end position, release the lock of the tensioned force for breaking.

A further object of the invention, in particular for the case in which the ampuls to be closed have oblique or eccentric spears or tips, is to be provide that no harmful lateral pressure or pull is executed on the spear or tip. Thus, the pincers may have a freely movable suspension instead of a rigid guide. With such a suspension, the pincers can adapt themselves to any position of the spear or tip and exercise thereupon no lateral pressure or pull. A further important advantage of this feature is that, because of the omission of guide means, the pincers are easily movable almost without frictional resistance, which is a further aim of the invention. Thus the breaking can be effected accurately at the optimum time if the pincers are suspended by a rope or a chain on which a spring acts to provide for the limited stretching. Moreover simple working parts can be provided for the stretching and the breaking and these may be mechanically returned to the starting position by means of a single movement.

According to a further aspect of the invention, the apparatus may comprise one or more burners or other sources of heat, holding means for the work piece, pincers or like holding or gripping means for the part to be separated easily movable in the breaking direction, means for opening and closing the pincers, and a moving mechanism imparting the breaking movement to the pincers, such mechanism comprising a force-producing member for example a spring or a weight, means for tensioning and locking such force-producing member, and means for releasing the lock at a time suitable for breaking the tip.

Conveniently further means may be provided to impart a preparatory stretching or compression movement to the pincers, such means preferably being in the form of a spring or weight; means for braking the stretching or compression movement; and finally means to effect the release of the lock by this stretching or compression movement.

The construction of the apparatus may also be effected in many different ways. As examples given without limitation, certain arrangements particularly suitable for sealing ampuls by the separation of a tip piece will now be described and illustrated with reference to the accompanying drawings, from which it may be seen how the invention may be applied to work pieces of unequal character and from which further details and advantages of the process will be apparent.

In the drawings:

FIGURE 1 shows, in vertical central section, sealing apparatus for ampul tips employing weights, in six working positions I to VI;

FIGURE 2 is a sectional view taken on line 2—2 of the same apparatus in position II of FIGURE 1;

FIGURE 3 is a side elevation of a portion of the same apparatus showing a removal device for the broken off tips in the two positions IV and V;

FIGURE 4 is a rear elevation of the removal device of FIGURE 3 in position V;

FIGURE 5 shows, in part vertical central section, alternative sealing apparatus for ampul tips employing springs;

FIGURE 6 is a section on the line S—S of FIGURE 5;

FIGURE 7 shows, in side elevation, further sealing apparatus for ampul tips employing a parallelogram linkage and weights at the commencement of the stretching procedure;

FIGURE 8 shows the apparatus of FIGURE 7 in side elevation after carrying out the breaking movement;

FIGURE 9 shows, in side elevation, means adapted for use with the apparatus of FIGURES 7 and 8 which provides for compression between the stretching and breaking; and FIGURE 10 shows a modification of the apparatus of FIGURES 7 and 8 so that the apparatus can be used alternatively for stretching or compression prior to breaking.

The separating and closing apparatus for ampul tips illustrated in FIGURES 1 to 4 uses a freely movable suspended pincers which fits clip-fashion onto the ampul tip and is therefore hereinafter called a "clip." The position of this clip and of weights and control means operating it is illustrated in six working positions I–VI. Of these position III is a full vertical central section showing also the lower parts.

A hollow column 2 is mounted on a stationary base plate 1 next to an ampul transport arrangement and carries at its upper end a sleeve 3 supporting a plate 4 through which pass guide rods 5 and 6 (only illustrated in FIGURE 2) and a cable pulley 8 is mounted in ball races in bearing blocks 7 on the plate 4. A cap 9 covers the cable pulley 8.

The sleeve 3 carries a locking lever 10 having a pawl and an arcuate feeler 11 (FIGURE 2) which penetrate into the hollow column 2 through a slot therein. A ring or clamp 12 with four bearings located thereon (see also FIGURE 2) surrounds the hollow column 2. Two of these bearings are located on upwardly extending projections of the ring 12 and form bearings 13 for a catch 14 which includes a pawl 15 projecting through a slot in the hollow column 2 and which is operated by a roller 17 mounted on an upper lever arm 16 of the catch. The third bearing 18 (FIGURES 2, 3, 4) located on the ring 12 carries a pivotal sector plate 19 which includes a delivery tube 20. The fourth bearing 21 serves to guide a brake and control rod 22 (FIGURES 2, 3, 4) which is pressed upwards by a spring 23 (FIGURE 1, position III) and carries, at its top, a stop 24 (FIGURES 2–4) for a pin 25 located on the sector plate 19 and, it its bottom, an arm 26 (FIGURES 1 and 2) which penetrates through a slot 27 (FIGURE 1, position III) into the interior of the hollow column and is there provided with a brake plate 28.

A guide arm 30 carries a stop member 31 and is moved by a lifting rod 29 (illustrated only in FIGURE 1, position III), sliding over the guide rods 5 and 6 (FIGURE 2), the stop member 31 operating the roller 17 of the pawl 15. A further operating member 32 is carried by a guide arm 30 and engages a roller 33 (FIGURES 2–4) on the sector plate 19. Furthermore the guide arm 30 carries a guide head A for the clip C which is suspended on a cable B. The guide head A consists of the guide ring 34 connected to the guide arm 30 and a guide core 36 slidable therein and pressed upwards by a spring 35.

The clip C consists of a cone 37 which fits into a conical bore in the guide core 36, an intermediate joint 38 and pincer arms 40 pivoted at 39 and having fingers 41. Closing of the pincers 40 is effected by an annular spiral spring 42, and opening by engaging upper pincer arm extensions 43 against the guide ring 34.

The clip C is connected to a preferably hollow control cone D and thence to a weight E by means of the cable B, which consists advantageously of a chain 44 (FIGURE 1, position I), passing over the pulley 8.

The weight E consists of a conical tip 45 and a rod 46 over which, after release of a knurled-head screw 47, the necessary number of ring weights 48 are placed. The weight is so calculated that the total weight of D and E exceeds the weight of the clip C by such an amount that the desired pulling action for stretching the tip is effected. For the purpose of changing the ring weights the whole head of the hollow column 2, with the parts 3, 4, 7–11, and the parts D, E, F hanging on the cable B are withdrawn upwards. For this purpose, the hollow column 2 is slit in the area of the lever 10 up to its upper end.

A loose sliding weight F, having a continuous bore widened conically at the top and bottom, is provided in the hollow column 2. An annular groove 49 for receiving the pawl of the lever 10 is provided immediately below the upper end of the weight F.

An upper lever arm of the locking lever 10 may be provided with a movable weight 50 (FIGURE 1, position I).

The transport of the ampuls may be effected on the straight path X or a curved path Y, as desired. The type of ampul transport arrangement is a matter of secondary importance. It is advisable to provide a tip support 51 just below the future melting point and an ampul body support 52 adjustable for different ampul thicknesses just above a base support 53. The support 51 need not be adjustable in height but supports 52 and 53 are adjustable for the different sizes of ampul (FIGURE 1, position III).

To prevent the ampuls falling out during transport, it is sufficient to provide a wire line (not shown) surrounding the path. At the working point, the ampuls are pressed against their supports 51 and 52 by means of a pad in order to bring them into the position required for the separation and at the same time to secure them against translatory movement. In order to make a control movement for this padding unnecessary, a pressure roller 54 with thick moss or foamed rubber covering is provided and is mounted on an arm 55 (FIGURE 1, position III) to press resiliently against the arriving ampul, rotating in a bearing 56. By means of a drive not shown, the roller 54 can be rotated for the purpose of rotating the ampul to be closed.

A burner carrier 58 provided with gas and/or air conduits carries one or more burners 57.

The manner of operation of the apparatus is as follows:

Position I shows how, by means of the guide head A with which it is rigidly connected by the interlocking of the cone 37 and core 36, the clip C is opened and guided over an ampul as it arrives between the burners.

On the downward movement of the clip C, the weights D and E and the weight F (carried by the weight E) reach their highest positions in the hollow column 2 and are locked in this position by the automatically operating locking lever 10 and pawl 15.

Position II shows how, immediately after the lowering of the head A, it rises immediately. This movement frees the upper pincer arm extensions 43 to close the pincer arms 40 through the action of the spring 42 and, as the cone 37 is released from its rigid connection to the guide core 36 and the clip C hangs freely on the cable B, the clip C grips the ampul tip and adapts itself to any position of the ampul spear. The two pivots 38 and 39 of the clip C permit engagement with a slightly displaced ampul spear without causing a disadvantageous lateral pressure or pull.

On lifting the guide arm 30, the stop member 31 approaches the roller 17 of the locking lever 15 which holds the weight E until the clip C has seized the tip of the ampul. As soon as that has happened, as shown in position III, the stop member 31 displaces the roller 17 and the pawl 15 so that the weight E (aided by the slight weight of the hollow control cone D) can cause a pulling action on the clip C.

However this pulling action only leads to a stretching of the tip when the appropriate degree of softness of the glass is reached. With increasing softening, an acceleration in the movement of the weights and thereby a thinning of the wall would occur. In order to prevent this and on the contrary obtain a thickening of the glass at and below the hottest zone, the pull of the weight is braked shortly after the commencement of its action. This braking is effected by friction of the control cone D on the arcuate feeler 11 of the locking lever 10 increased by the friction on a projection 3' of the sleeve 3 against which the control cone D is pressed by the feeler 11. The amount of the pressure (and the friction and braking resulting therefrom) may be varied as desired by the adjustable weight 50 (only shown in FIGURE 1, position I) on the locking lever 10. FIGURE 1, position III, shows the locking lever 10 as just ready to free the weight F held by it.

In position IV, the released weight F has moved down and, on striking the cone 45 of the weight E, has moved this also. This achieves a sudden breaking off of the tip at the hottest part, i.e. just above the accumulation of glass caused by the original slight stretching.

The downward movement of the weights D, E, F is then so resisted by the resiliently mounted brake plate 28 that the clip C with its cone 37 gently enters the bore of the guide core 36 of the head A as shown in position V. It should be noted that, on the upward movement of the guide arm 30 effected by the rod 29, the head A engages the plate 4 to cause displacement of the core 36 relative to the guide ring 34 (FIGURE 1, positions IV and V).

In position V the guide arm 30 with its associated parts is in its highest position. The stop member 31 engages the upper arm of the locking lever 10 and lifts it after it has fallen back into its locking position on the passage of the control cone D. This step is in itself superfluous, but it provides securing means for the cases in which for any reasons (for example, flame failure due to a sudden strong draught in the chamber) the melting process is disturbed and accordingly the stretching or breaking off step is delayed. Should this occur the weight F would be released automatically at the last moment of the timing prescribed by the machine, so that the breaking off occurs with force or if the material of the work piece should not have been sufficiently softened the clip would be drawn off the spear so that the clip is available for the next working step.

In the highest position of the guide arm 30, the guide head A is completely compressed and the lower surface of the guide core 36 is flush with the guide ring 34. This step is necessary in order to prevent, on penetration of the cone 37 into the core 36, engagement of the upper pincer arm extensions 43 with the guide ring 34 and a premature opening of the pincers.

On descent of the weights E, F onto the brake plate 28, the resiliently mounted brake and control rod 22 is lowered by the arm 26 connected to it (FIGURE 1, position III). Hence the stop 24 carried by the rod 22, which has up till now locked the pin 25 (FIGURE 3, position IV), frees this pin so that the sector plate 19 with the delivery tube 20 can spring into the position shown in FIGURE 3, position V and in FIGURE 4. This is effected by a spring 59 which, for example, is connected to an extension of the plate 4.

By means of this automatic control of the raising of the delivery tube 20, the top thereof reaches its working position virtually at the same time as the clip A, with the drawn off end of the tip, reaches its uppermost position.

Thus the last phase can begin immediately and in this phase the guide arm 30 with its suspended parts carries out a rapid and uninterrupted downward movement to the final position which is the same as FIGURE 1, position I.

FIGURE 1, position VI, shows the commencement of this movement, namely the position in which the guide ring 34 of the head A has moved far enough to open the pincers 40 of the clip C, the cone 37 remaining in the guide core 36 in consequence of the pull of the weights D, E, F. The freed tip falls through the delivery tube 20 into a container (not shown).

The downward movement of the guide arm 30 and the head A guiding the opened clip C continues without any further interruption, since the operating member 32, at the moment of opening of the clip and the beginning of its downward movement, strikes the roller 33 (FIGURE 3, position V, and FIGURE 4) and accelerates the delivery tube 20 in front of the clip, forcing it to the side until the pin 25 snaps behind the stop 24

(FIGURE 3, position IV). This stop 24 is displaced downwards somewhat by the circular path of the pin 25 due to the resilient mounting of the control rod 22.

The downward movement of the lifting rod 29 (FIGURE 1, position III) moving the guide arm 30 with head A etc. can therefore (including the opening of the clip resulting at position VI) be effected as quickly as the downward movement of a filling needle at a filling station.

The ampul transport is thus so determined that a fresh ampul arrives just when the lower end of the clip is directly over its tip.

For the mechanical operation of the whole separating and closing apparatus only the rod 29 (FIGURE 1, position III, and FIGURE 2) is actuated. It carries out a rapid downward movement and a somewhat slower but immediate upward movement. All other movements are derived from, or automatically controlled by, this up-and-down movement.

The same apparatus can also employ rigidly guided pincers instead of the freely movable clip. It is sufficient to connect the pincers to a sliding rod which is mounted slidably in the guide core 36 and connected by means of the cable to the weights D and E which are correspondingly to be dimensioned. To reduce friction, it is advisable to effect the bearing on a guide between two sliding ball bearings. If rigidly guided pincers are also to be rotatable, whereby, because of the necessary ball bearings, a sleeve of greater diameter is needed, two opposed sliding ball bearings are sufficient for the axial movement. However three balls distributed around the sleeve are better and still better is a closed slide ball bearing with three rows of balls and a common cage as illustrated in FIGURES 5 and 6.

FIGURES 5 and 6 show a separating and closing apparatus for ampul tips which is similar to that of FIGURES 1 to 4 (after substitution of the freely movable pincers by rigidly guided pincers) and likewise the mechanical operation is effected by means of a single lifting rod in which springs provide for the stretching and the breaking off movement instead of weights.

A sliding body 63 is movable on guide rods 61 and 62 and carries a carrying sleeve 64. A sliding sleeve 66 is axially movable in the carrying sleeve 64 through a sliding ball bearing 65. A sleeve 68 is rotatably mounted in the sliding sleeve 66 in a ball bearing 67 and carries at its lower end a head 69 for bearings 70 of two L-shaped pincer members 71. The short arms of the two pincer members 71 are toothed and engage one another and carry pins 72 which are laterally slidable in a stop 73 at the lower end of an operating rod 74 which is guided in the sleeve 68. The operating rod 74 also carries a plate 75 just below its upper end. A spring 76 urges the plate 75 and therefore the operating rod 74 upwardly and in this manner causes the pincers 71 to be closed. The foot of a carrying arm 78 is mounted in the sliding body 63 and is adjustable in height by an adjusting screw 77, this carrying arm 78 passing through openings 79 in the carrying sleeve 64, in the bearing cage, and in the sliding sleeve 66 to the inside of the latter and there carries an annular plate 80. A spiral compression spring 81, carrying the sliding sleeve 66 with its contents, is supported on the annular plate 80.

A lifting rod 82, which forms a single mechanical operating means for the apparatus, runs through an opening in the sliding body 63 and carries on its upper end a pincer opening arm 83 having a pressure piece 85 and bushes 84 sliding over the guide rods 61 and 62. On lowering, this pressure piece 85 presses onto the operating rod 74 and opens the pincers 71. At a certain distance below the pincer opening arm 83 a control slide 86 having bushes 87 slides with slight friction on the guide rods 61 and 62. An adjusting ring 88 is located on the lifting rod 82 in the space between the control slide 86 and the sliding body 63. A powerful compression spring 89 is arranged around the lifting rod 82 to urge the sliding body 63 upwards. A locking lever 90, mounted on the sliding body 63, snaps into a notch 91 in the guide rod 62 and holds the sliding body 63 locked against the pressure of the spring 89. A control stop 92 on the sliding sleeve 66 releases the locking lever 90 on upward movement of the sliding sleeve.

The manner of operation of the apparatus is as follows:

On lowering the lifting rod 82, the pressure piece 85 presses onto the operating rod 74, which, due to the angled shape of the parts engaging one another, causes the pincers 71 to be turned to the position illustrated in the drawing. On further lowering, the pincers open and, as soon as the plate 75 engages a cap on the sliding sleeve 66, are moved downwards in the open state until the lowest position illustrated in the drawing is reached and the locking lever 90 falls into the notch 91. During this downward movement, the control slide 86 is pushed downwards by the bush 84, carrying with it the sliding sleeve 66 and, through its bush 87, the sliding body 63. Thus the spring 89 is compressed.

This is the starting position for the separating and closing treatment which begins with the lifting of the lifting rod 82 which movement is followed by the operating rod 74 under the pressure of the spring 76 so that the pincers 71 close gently and without damaging the glass of the ampul tip. Shortly thereafter, the continued upward movement of the lifting rod 82 causes the ring 88 to move the control slide 86 upwards. The drawing shows the whole apparatus at the commencement of this upward movement where the control slide has just moved away from the sliding body 63 and the sliding sleeve 66. Whilst the sliding body 63 is held locked by the locking lever 90, the sliding sleeve 66 can move upwardly under the pressure of the spring 81 as soon as the glass is sufficiently softened to yield to the pull exercised by the pincers. After a short stretching of the softened part of the ampul tip, the stop 92 strikes against the locking lever 90. The resistance which has to be overcome to release the locking lever brakes the stretching movement until finally the locking lever 90 is released and the compressed spring 89 urges the sliding body 63 and the pincers 71 upwardly with considerable force to jerk off the end of the tip.

The lifting rod 82, which had previously lifted far enough with the pincers opening arm 83 and the control slide 86 to facilitate the high speed movement of the sliding body 63, now begins its described downward movement. Hence, the pincers opening shortly after the commencement of this downward movement, the broken-off tip part is released by the pincers.

In the separating and closing apparatus for ampul tips illustrated in FIGURES 7 and 8, a parallel linkage with two long members 101 and 102 serves as a carrier and lifting means for a bearing 103 of pincers 104 which can be opened by pressure on the head 105 of an operating rod normally kept raised by a spring which corresponds to spring 76 of the example of FIGURE 5. A rocker arm 107 provided with a roller 106 at one end is mounted on the upper member 101 to provide this pressure and is so held, for example in the equilibrium position, by means of a weak leaf spring 108 that both ends are out of contact as illustrated in FIGURE 7. The lower member 102 is extended by weight arm 109 which, with a tilting weight 110 (in its raised position) that is mounted pivotally thereon and a sliding weight 111, forms counter balance for the parallel linkage, the rocker arm, and the pincers. The sliding weight 111 is so adjusted as to cause the pincers 104 to develop the necessary pulling action for the stretching treatment. The trip weight 110 rests on a sliding surface 112 which is adjustable by means of an adjusting screw 113. A plunger 114, mounted on a lifting and lowering control rod 115, is positioned under the roller 106. A lifting rod 116 with an angle attachment 117 for the raising of the weight 110 is located under this weight.

The ampuls are guided by means of a carrier 119 along a mounting 118 under the pincers 104 and are held and rotated by a roller 120. A burner 121 and a receiving dish 122 for the broken-off tip pieces are provided on the mounting 118.

The method of operating the apparatus is as follows:

In the position illustrated in FIGURE 7 the pincers 104 have already taken hold of the ampul tip. In consequence of the excess weight of the weight arm 109 adjusted by the sliding weight 111, the pincers 104 exercise a slight pull on the ampul tip which causes, after initial softening, a slight stretching of the tip. This causes a lowering of the weight arm 109 and the tilting weight 110 which slides along the upper edge of the sliding surface 112 and, since the weight 110 is of upwardly widened form and the surface 112 is not completely parallel thereto, causes slight tilting of the weight 110. On further lowering, the side of the tilting weight 110 becomes parallel to the sliding surface 112 and the increased friction provides greater resistance than with the previous sliding along the upper edge to cause the desired delay in the stretching of the ampul tip. Finally a slight further lowering of the tilting weight 110 over the sliding surface 112 moves it over the dead centre and it tilts over. The weight 110, striking on the weight arm 109, effects a sudden breaking off of the tip piece to be separated. The roller 106 of the rocker arm 107 of the raised parallel linkage strikes on the plunger 114 (see FIGURE 8) and presses down the head 105 of the operating rod of the pincers to open the pincers. Thus, as can be seen from FIGURE 8 and because of the movement of the pincers on a circular path, the tip piece which is thrown from the pincers before reaching the position shown moves in an arc into the receiving dish 122. The pincers remain open whilst the weight arm 109 (which has become heavier due to the larger leverage of the tilted weight 110) holds the head 105 pressed against the rocker arm 107.

The control rod 115 with the plunger 114 is raised to return the apparatus to the starting position. The pressure against the roller 106 of the rocker arm 107 returns the pincers 104 (in the opened state) back to the starting position. Lifting of the lifting rod 116 and the angle attachment 117 raises the tilting weight 110 into its tensioned and locked position. Whilst the weight 110 is still supported by the angle attachment 117 the control rod 115 is lowered and on releasing the rocker arm 107 the pincers 104 close around a new ampul tip. After they have found a grip, the whole movable system can be released by lowering the lifting rod 116, which state is illustrated in FIGURE 7 and is taken as the starting point of the description of the manner of working.

FIGURE 9 shows the weight arm 109 of the apparatus illustrated in FIGURES 7 and 8 in which the tilting weight 110 carries on its front or rear side a lever arm 123. On a fixed point of the apparatus below this lever arm is mounted a flexible stop 124, for example a leaf spring. With the aid of these two additional members a short compression of the softened zone is effected after stretching the ampul tip but before the breaking off. This comes about in the following manner.

After the commencement of the tilting of the weight 110, the lever arm 123 strikes against the stop 124. The excess weight of the longer and heavier lever arm formed by the weight 110 cannot prevent a further downward movement of these parts. But due to the resistance of the stop 124 a reaction force is produced and due to this reaction force the weight arm 109 makes a short upward movement while the heavy weight 110 continues its downward tilting movement. Thus the lever arm 109 and the weight 110 act as a sort of toggle-link. Due to this movement the point 125 moves towards the end of the leaf spring 124 until finally the lever arm 123 slides from the spring 124. The weight 110 continues its tilting movement until it strikes the arm 109 (compare FIG. 8) whereby the breaking of the work piece is effected. The cooperation of these parts may be adjusted depending upon the displacement of the striking point 125 and the degree of flexibility of the leaf spring 124. By varying the dimensions of the lever arm 123 and the leaf spring 124, their positions relatively to one another, the degree of flexibility of the leaf spring or other stop as well as the form of the upper surface of the stop on which the striking point moves, short, elastic, soft or hard compressions of shorter or longer duration according to requirements can be obtained. Conversely the lever arm 123 may be flexible and the stop 124 rigid or both parts may be flexible or rigid. In the example shown, an adjusting screw 127 is provided by means of which the leaf spring 124 can be brought into different angular positions.

Such a short compression after a limited stretching has the two advantages that thinning of the wall occurring during the stretching is compensated and the reinforced part under the hottest flame zone (at which the breaking off takes place) is compressed so that a particularly resistant fused end results. This compression can be carried out with suitable modifications also in connection with other constructions of the apparatus according to the invention.

Alternatively, to provide limited compression without previous stretching, all forms of apparatus with rigidly guided pincers can be used, if these forms of apparatus according to the invention effect stretching by means of a spring or weight force and the direction of effect of the force is reversed and the locking members or control members are suitably adapted.

FIGURE 10 illustrates how in a simple manner the apparatus shown in FIGURES 7 and 8 can be so arranged that it can be used as desired for stretching or for compression. Instead of the tilting weight 110 a suitable diamond-shaped tilting weight 128 is used and a second sliding surface 129 is provided in addition to the sliding surface 112, this sliding surface 129 being regulatable by means of an adjusting screw 130. To use the compression process, the slide weight 111 is moved to the right so that the parallel linkage with the pincers is the heavier to effect the compression. At the commencement of the softening of the heated point, the pincers lower and lift the tilting weight 128, the side surface of which now slides along on the upper sliding surface 129 in a manner similar to the description already given in FIGURES 7 and 8, making contact first on the upper edge and then on its whole surface until finally it is forced over the dead centre and tilts. The breaking off point obtained in this manner has a greater wall thickness than one obtained after stretching. However there is no direct thickening, as might be assumed from the term "compression," as no sudden compression is effected, but it is rather a matter of a contraction of the heated point yielding to the slight excess pressure, this contraction being adjustable in its extent as desired by the excess weight applied and by the thickness and form of the flame. It may therefore be an advantage in the separation and fusing of thick walled pieces to use the stretching process and, with thin walled pieces, to use the compression process according to the invention or, as described with reference to FIGURE 9, a combination of both processes.

The drawings relate to the separation and fusing of ampuls as it is known that in such cases, in particular, there are many possibilities of disturbances and faults which have had to be considered when making the invention and are taken into consideration by suitable means. For the separation of one part of other rod or tubelike heat softenable work pieces, the arrangements described are either unaltered or are usable with the variations required by special circumstances but without departing from the invention. The same applies also to other modifications of the process or apparatus according to the invention. The possibilities of the combination of the different individual elements within suitable apparatus are numerous. Thus for example, brake members and a drop weight similar to the weight loaded lever illustrated in FIGURE 1 may be combined with other arrangements similar to those illustrated in FIGURES 7 to 10 or, for example, the spring 81 may be replaced by a weight loaded lever and the release of the locking pawl 90 may be effected by a tilting weight located on such lever. Further the release of the lock of the tensioned breaking means f.i. may be effected by an electro-magnetic relay.

Finally the invention may be extended in its use in that instead of the spring or weight forces mentioned heretofore for the breaking off and the stretching and compression, any other suitable force within the scope of the invention may be used for the sudden breaking off and any uniform and flexible force suitable for stretching or compression and acting independently of the machine stroke is applicable; for example, pneumatic, hydraulic, electrical or magnetic forces.

I claim:

1. Apparatus for the mechanical separation of rod or tubelike work pieces made of heat softenable material, comprising means for holding the workpiece a grip for gripping and holding the work piece end to be severed, a parallel linkage carrying on its free end said grip, a weight arm rigidly associated with said parallel linkage, actuating means operatively connected to said weight arm and adapted for storing potential force and applying said force to said weight arm when released, means for potentially loading said actuating means, heating means for softening the work piece at the line of breach, an adjusting weight adjustably positioned on said weight arm and causing moderate movement of said grip relative to said work holding means as said work piece softens, said adjusting weight producing a yieldable force irrespective of the timing of the apparatus; control means normally holding said potentially loaded actuating means inactive and controlled by said movement of said weight arm for releasing said potentially loaded actuating means after said movement of said grip through a predetermined amount, thereby imparting, independently from the timing of the apparatus, sudden jerky movement to said weight arm and to said grip away from said work holding means and causing forceful instantaneous breaking-off of said work piece end.

2. The apparatus of claim 1, including an opening member operatively connected with said grip for releasing said severed work piece end, operating means mounted on said linkage and adapted to contact said grip opening member, an abutment contacting said operating means when said linkage tilts under said sudden jerky movement; said abutment being mobile and serving as drive means for conducting said linkage to starting position and said grip to grip said work piece end.

3. The apparatus of claim 1, in which said actuating means includes a tilting weight pivotally mounted on said weight arm, said control means including a member located in fixed relation to said tilting weight and having a downwardly inclined surface against which the tilting weight slides as the work piece softens and said linkage tilts, moving along said surface until, by moving past dead center it is released and, impacting said weight arm, applies said sudden jerky movement to said grip; said loading means comprising a means for lifting said tilting weight to starting position inactively resting against said sliding surface.

4. The apparatus of claim 1, including a contact arm carried by said tilting weight, and a resilient arm abutment on said apparatus positioned so that, after the work piece has been stretched and said tilting weight has moved over dead center, said contact arm contacts said arm abutment, whereby the arm abutment imparts a short upward movement to said weight arm and a compression of the work piece in the softened zone before the breaking off.

5. Apparatus for the mechanical separation of rod or tubelike work pieces made of heat softenable material, comprising means for holding the work piece, a grip means for gripping and holding the work piece at an end to be severed, a movable carrier supporting said grip means, controlled actuating means operatively connected to said grip carrier and capable of storing potential force and applying said force to said grip carrier when released, means for potentially loading said actuating means, heating means for softening the work piece at the line of breach, and control means normally holding said actuating means inactive when potentially loaded and for instantaneously releasing said potentially loaded actuating means after suitable softening of said line of breach for abruptly imparting a sudden forcible jerk to said grip carrier and said grip means endwise of said work piece, thereby causing violent instantaneous breaking-off of said work piece end at said softened line of breach.

6. The apparatus of claim 5, in which said actuating means includes a spring.

7. The apparatus of claim 5, in which said actuating means includes a falling weight arranged to apply a sudden force, when released by said control means to said grip carrier.

8. The apparatus of claim 5, in which said actuating means includes a pivoted weight arranged to store potential force when lifted over unstable equilibrium, to engage said control means, and to be urged by engagement with said control means past dead center for becoming active to fall and to apply a sudden force to said grip carrier.

9. The apparatus of claim 5, including release means on said grip means, and abutment means positioned to be contacted by said release means after movement of said grip means by said actuating means, whereby said work piece end is released from said grip means.

10. Apparatus for the mechanical separation of rod or tubelike work pieces made of heat softenable material, comprising means for holding the work piece, a grip means for gripping and holding the work piece at an end to be severed, a movable carrier supporting said grip means, controlled actuating means operatively connected to said grip carrier and capable of storing potential force and applying said force to said grip carrier when released, means for potentially loading said actuating means, heating means for softening the work piece at the line of breach, means operatively connected to said grip carrier for applying an adjustable force to said grip carrier for causing moderate movement of said grip means relative to said work holding means as said work piece softens, said last-named means producing a yieldable force irrespective of the timing of the apparatus; control means operatively connected to said grip carrier normally holding said actuating means inactive when potentially loaded and for releasing said potentially loaded actuating means after a predetermined amount of said moderate movement of said grip means, thereby abruptly imparting, independently from the timing of the apparatus, a sudden forcible jerk to said grip carrier and to said grip means endwise of the work piece and causing violent, instantaneous breaking-off of said work piece end at said softened line of breach.

11. The apparatus of claim 10, in which braking means are provided and are arranged to slow down said moderate movement of said grip means prior to the release of said potentially loaded actuating means.

12. Apparatus for the mechanical separation of rod or tubelike work pieces made of heat softenable material, comprising means for holding the work piece, a grip means for gripping and holding the work piece at an end to be severed, a movable carrier for said grip means in the form of a two-armed lever carrying at one end said grip means, controlled actuating means operatively connected to said lever and capable of storing potential force and applying said force to said grip carrier when released, means for potentially loading said actuating means, heating means for softening the work piece at the line of breach a weight arm connected to the other end of the two-armed lever, an adjustable weight on the weight arm for causing adjustable moderate movement of said grip means relative to said work holding means as said work piece softens, control means operatively connected to said grip carrier normally holding said actuating means inactive when potentially loaded and for releasing said potentially loaded actuating means after a predetermined amount of said moderate movement of said grip means, thereby abruptly imparting a sudden forcible jerk to said lever and to said grip means endwise of the work piece and thereby causing violent instantaneous breaking-off of said work piece end at said softened line of breach.

13. Apparatus for the mechanical separation of rod or tubelike work pieces made of heat softenable material, comprising means for holding the work piece, a column, a pulley supported by said column, a cable running over said pulley and having two ends, a grip means for gripping and holding the work piece at an end to be severed mounted on one end of said cable, an adjusting weight mounted on the other end of said cable for effecting moderate draw of said grip means upon said work piece end, a drop weight positioned on said column above said adjusting weight, means for holding said drop weight inactive, drive means for conducting said grip means to grip said work piece end and thereby, by means of said cable, also lifting said adjusting weight, and, by means of said adjusting weight, lifting said drop weight to a position engaging said holding means; heating means for softening said work piece at the line of breach; control means for releasing said holding means when said heating means has softened and said grip means has stretched said work piece a predetermined amount, thereby effecting, independently from the timing of the apparatus, the fall of said drop weight onto said adjusting weight for abruptly imparting a sudden forcible jerk to said grip means endwise of the work piece and causing violent instantaneous breaking-off of said work piece end at the softened line of breach, and means for releasing said severed work piece end from said grip means.

14. The device of claim 13, in which said control means includes a conical member on said cable, a frictional surface on said column engaged by said conical member, said holding means being rigidly connected with a friction member, biasing means being provided to urge said friction member towards said conical member and the latter towards said friction surface, whereby said conical member is slowed in its movement prior to releasing said drop weight.

15. The apparatus of claim 13, wherein said grip means includes cooperating tongs, spring means on said grip means biasing its tongs to the closed position, arm extensions on said tongs, a contact member positioned to engage said arm extensions for opening said tongs of said grip means when said grip means is adjacent to its highest position.

16. The apparatus of claim 13, including a work piece end receiving member, biasing means tending to move said receiving member below said grip means when it is in its highest position, catch means normally holding said receiving member in an inoperative position, and catch releasing means actuated by said adjusting weight in its lowest position.

17. Apparatus for the mechanical separation of rod or tubelike work pieces made of heat softenable material, comprising means for holding the work piece, a column, a sliding body slidingly mounted on the column, an actuating spring urging said sliding body along said column, means holding said body inactive and preventing such movement, a sliding member carried by said sliding body and movable relatively thereto, a grip means for gripping and holding the work piece at an end to be severed, said grip means being carried by said sliding member; an adjusting spring effecting moderate movement of said sliding member relative to said sliding body and of said grip means relative to said work holding means, drive means for conducting said grip means to grip said work piece end, said drive means simultaneously taking along said sliding member to a position engaging said holding means; heating means for softening the work piece at the line of breach; control means controlled by the movement of said sliding member for releasing said holding means when said heating means has softened the work piece and said grip means has moved a predetermined amount, thereby abruptly effecting, independently from the timing of the apparatus, a sudden forcible jerk of said sliding body together with said sliding member and said grip means endwise of the work piece and causing violent instantaneous breaking-off of said work piece end at said softened line of breach, and means for releasing said severed work piece end from said grip means.

18. Apparatus for the mechanical separation of rod or tubelike workpieces made of heat softenable material, comprising means for holding the workpiece, a grip means for gripping and holding the workpiece at an end to be severed, a movable carrier supporting said grip means, controlled actuating means operatively connected to the grip carrier and capable of storing potential force and applying said force to said grip carrier when released, means for potentially loading said actuating means, heating means for softening the workpiece at the line of breach, means operatively connected to said grip carrier for applying an adjustable force to said grip carrier for causing moderate movement of said grip means relative to said work holding means as said workpiece softens, said last-named means producing a yieldable force, control means operatively connected to said grip carrier normally holding said actuating means inactive when potentially loaded and for releasing said potentially loaded actuating means thereby abruptly imparting a sudden forcible jerk to said grip carrier and to said grip means endwise of the workpiece and causing violent, instantaneous breaking off of said workpiece end at said softened line of breach.

19. Apparatus for mechanical separation of rod or tubelike workpieces made of heat softenable material, comprising means for holding the workpiece, a movable grip means for gripping and holding the workpiece at an end to be severed, a movable carrier supporting said grip means, heating means for softening the workpiece at the line of breach, an actuating means capable of storing potential force and applying said force to said grip carrier when released, means for potentially loading said actuating means, means normally holding said actuating means inactive when potentially loaded and for instantaneously releasing said potentially loaded actuating means at a moment which is automatically regulated dependent upon the degree of softness of the line of breach for abruptly imparting a sudden forcible jerk to the grip carrier endwise of said workpiece and thereby causing violent instantaneous breaking off of said workpiece end at said softened line of breach.

References Cited in the file of this patent

UNITED STATES PATENTS

| | | |
|---|---|---|
| 1,328,530 | Loepsinger | Jan. 20, 1920 |
| 2,258,408 | Cozzoli | Oct. 7, 1941 |
| 2,379,342 | Cozzoli | June 26, 1945 |
| 2,379,343 | Cozzoli | June 26, 1945 |
| 2,439,754 | Schutz | Apr. 13, 1948 |
| 2,689,677 | Unger | Sept. 21, 1954 |